L. W. HOLMES.
ANTISKID DEVICE FOR AUTOTRUCK WHEELS.
APPLICATION FILED JAN. 14, 1919.
1,329,764.
Patented Feb. 3, 1920.
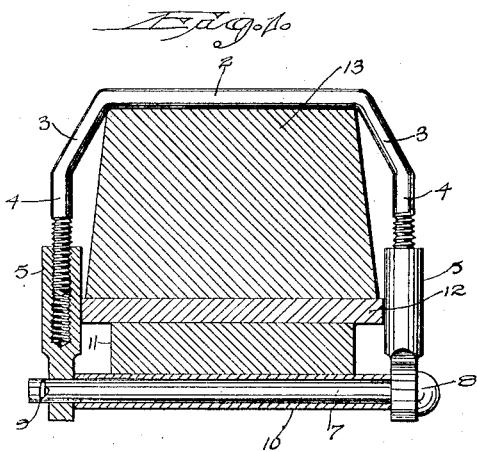
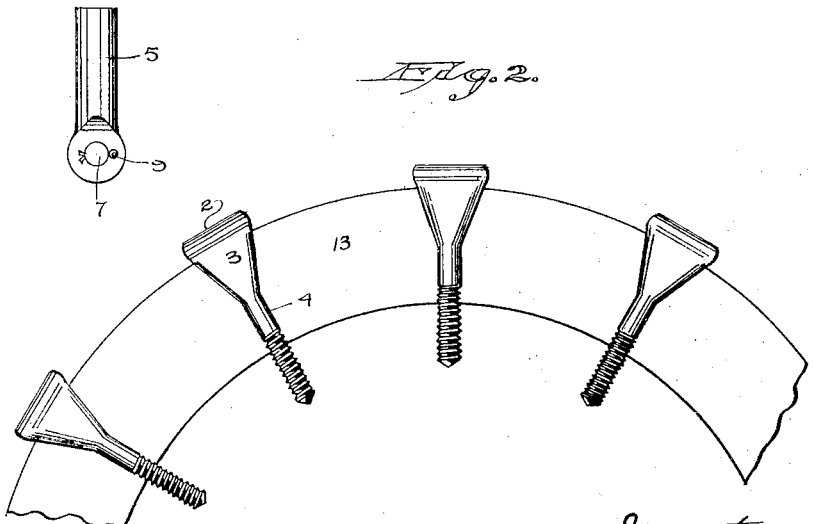
Inventor.
Leslie W. Holmes
by Seymour & Earle
attys

UNITED STATES PATENT OFFICE.

LESLIE W. HOLMES, OF SHELTON, CONNECTICUT, ASSIGNOR TO THE HOLMES MFG. CO., OF SHELTON, CONNECTICUT, A CORPORATION.

ANTISKID DEVICE FOR AUTOTRUCK-WHEELS.

1,329,764.  Specification of Letters Patent.  Patented Feb. 3, 1920.

Application filed January 14, 1919. Serial No. 271,010.

*To all whom it may concern:*

Be it known that I, LESLIE W. HOLMES, a citizen of the United States, residing at Shelton, in the county of Fairfield and State of Connecticut, have invented a new and useful Improvement in Antiskid Devices for Autotruck-Wheels; and I do hereby declare the following, when taken in connection with the accompanying drawings and the characters of reference marked thereon, to be a full, clear, and exact description of the same, and which said drawings constitute part of this application, and represent, in—

Figure 1 a view partly in elevation and partly in transverse section showing my improved anti-skid device applied to the rim of an auto-truck wheel having a single tire.

Fig. 2 a broken view in side elevation showing several of the grippers in their relation to the face of the tire, but without their associated parts.

Fig. 3 a detached view in side elevation of one of the adjustable coupling-sockets.

This invention relates to an improvement in anti-skid devices for auto-truck wheels, the object being to provide at a low cost for manufacture a simple, durable and reliable device constructed with particular reference to facility of adjustment.

With these ends in view, my invention consists in an anti-skid device for auto-truck wheels, having certain details of construction as will be hereinafter described and pointed out in the claim.

In carrying out my invention as herein shown, I employ a plurality of one-piece grippers made of wrought or cast iron and each consisting of a flattened tread 2 terminating at each end in a flattened inclined, tapering arm 3 each of which merges into a threaded stem 4 which latter are parallel to each other and stand at a right angle to the plane of the tread 2. The threaded stems 4 enter threaded holes in the outer ends of complementary coupling sockets 5 the inner ends of which are formed with eyes 6 for the reception of the ends of a coupling bolt 7 one end of which has a head 8, and the other end of which is perforated for the reception of a cotter pin 9. A rubber or equivalent sleeve 10 surrounding the bolt 7 prevents the same from defacing the varnish or other finish upon the inner surface of the wood wheel-rim 11 which carries the iron rim 12 upon which the tire 13 is shrunk. In the initial application of the grippers to the tire, the coupling-sockets 5 are adjusted upon the threaded stems 4 of the tread 2 with reference to the thickness of the tire, preparatory to the passage of the bolt 7 through the eyes 6 of the coupling-sockets 5. The treads 2 extend transversely across the face of the tire which is, so to speak, embraced by their threaded stems. When the tire is reduced in thickness by wear, it is a simple matter to remove the bolts 7 and readjust the sockets 5 to take up such wear.

It will be understood of course, that a plurality of anti-skid devices such as are herein shown and described, are employed, their number depending upon the character of the wheel and the circumstances of its use. If desired the device may be adapted to be used with dual tire-auto-trucks, no change being necessary except to lengthen the tread 2 and the bolt 7.

I claim:—

In an anti-skid device for auto-truck wheels, the combination with a one-piece gripper having a flattened tread merging at its respective ends into inwardly bent outwardly inclined flattened and tapered arm terminating in parallel threaded stems, and adjustable connecting means adapted to extend transversely under the tire and to engage with the said threaded stems, whereby the gripper is held in place.

In testimony whereof, I have signed this specification in the presence of two subscribing witnesses.

LESLIE W. HOLMES.

Witnesses:
JOHN SHEEHY,
ELEANOR JOHNS.